March 13, 1951 T. OBSZARNY ET AL 2,544,898

CENTERING DEVICE FOR BEAMS OF CATHODE-RAY TUBES

Filed Dec. 31, 1949 2 Sheets-Sheet 1

Inventors:
Thedore Obszarny,
John Schmidt
By Bair & Freeman
Attys.

March 13, 1951 T. OBSZARNY ET AL 2,544,898

CENTERING DEVICE FOR BEAMS OF CATHODE-RAY TUBES

Filed Dec. 31, 1949 2 Sheets-Sheet 2

Inventors:
Thedore Obszarny,
John Schmidt
By Bair & Freeman
Attys.

Patented Mar. 13, 1951

2,544,898

UNITED STATES PATENT OFFICE 2,544,898

CENTERING DEVICE FOR BEAMS OF CATHODE-RAY TUBES

Thedore Obszarny and John Schmidt, Chicago, Ill., assignors to Guardian Electric Manufacturing Co., Chicago, Ill., a corporation of Illinois Application December 31, 1949, Serial No. 136,294

6 Claims. (Cl. 313—75)

This invention relates to a centering device for the beam of cathode ray tubes and particularly to a magnetic field type of centering device.

Heretofore cathode ray tubes for television use have been provided with a set of deflecting coils and a focus coil. The deflecting coils create a magnetic field which deflects the beam of the cathode ray tube so that the beam scans the fluorescent screen at the front of the tube. The focus coil creates a magnetic field which focuses the beam at a single point on the fluorescent screen, which point moves across the screen to produce an image thereon. It is also necessary to provide horizontal and vertical centering of the beam, so that the picture will be centered on the fluorescent screen which is visible to the viewer. Heretofore this centering has been accomplished by two different methods, but has been unsatisfactory for various reasons.

One method was to change the value of the current passing through one pair of deflecting coils for horizontal centering and through the other pair of deflecting coils for vertical centering. Such a method required additional adjustments and devices which were usually within the cabinet of the television set and were difficult to reach and adjust.

The second method was to bodily shift the focus coil on the neck of the cathode ray tube. This method had the disadvantage of being inaccurate and difficult to adjust and was also subject to possible accidental movement due to vibration or other factors with the result that the centering was not satisfactory.

In addition to the above disadvantages, both methods were hazardous in that very high potentials exist within the television set when operating and it is necessary to center the picture while the set is in operation. The person making the adjustment, therefore, was, many times, subjected to high potential shocks from parts of the television set.

To the best of our knowledge, centering of the beam of a cathode ray television tube has never been done by the use of an electromagnetic field which is distinct from the electromagnetic fields produced by the deflecting or focus coils.

It is, therefore, an object of our invention to provide a centering device for the beam of cathode ray television tubes which produces an electromagnetic field separate and distinct from the fields produced by the focus or deflecting coils.

It is a further object of the invention to make a centering device of the type described which is exceptionally simple and inexpensive.

It is also an object of the invention to provide a centering device of the type described in which the magnetic field is variable in order to deflect the beam in the right direction and produce centering thereof.

It is also an object of the invention to provide a centering device of the type described which has indicia thereon to indicate whether the magnetic field is or has been increased or decreased and in which direction.

It is another object of the invention to provide a centering device of the type described in which the magnetic field produced for centering the beam may be adjusted from a maximum value to substantially zero and wherein the effective fields may be moved to any position in a 360° range to move the beam in a centering direction.

It is further an object of the invention to provide a mounting for a centering device of the type described which is inexpensive and which will not harm or implode the neck of the cathode ray tube.

It is an additional object of the invention to provide a centering device of the type described which utilizes a pair of inexpensive permanent magnets adjustable relatively to each other.

With these and other objects in view, our invention consists in the construction, arrangement and combination of the various parts of our device whereby the objects contemplated are attained as hereinafter more fully set forth, pointed out in our claims, and illustrated in the accompanying drawings, in which:

Figures 1, 2, 3, 4, 5:
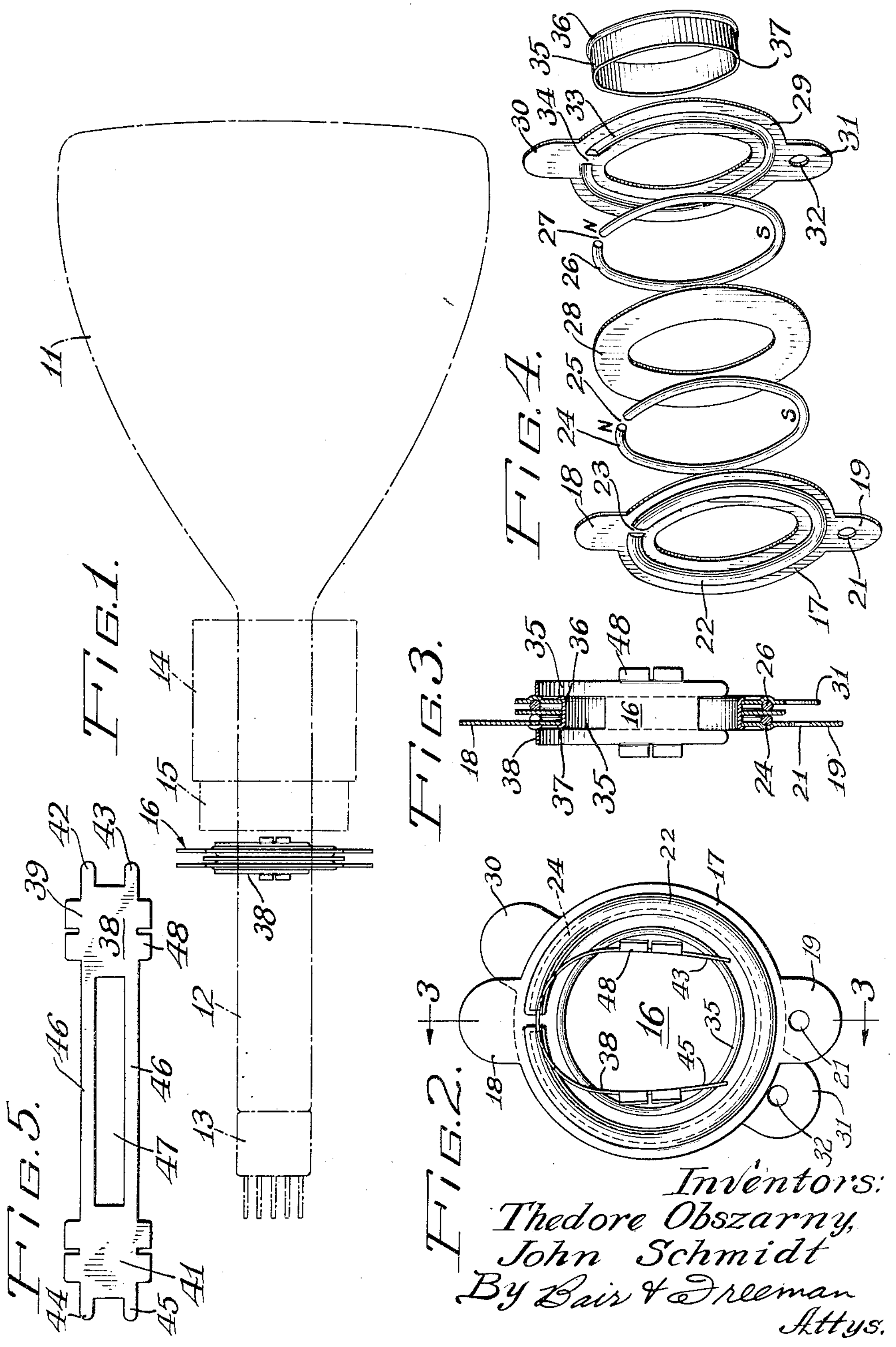
Figure 1 is a diagrammatic view of a cathode ray television tube with the novel centering device shown mounted on the neck thereof and with the deflecting and focus coils also shown diagrammatically mounted on the neck thereof.
Figure 2 is an end view of the centering device with the mounting strip secured thereto.
Figure 3 is a sectional view of the centering device and mounting strip taken on line 3—3 of Figure 2.
Figure 4 is an exploded perspective view of the centering device.
Figure 5 is a plan view of the mounting strip prior to the time it has been bent to the position shown in Figure 2.

Referring specifically to the drawings for a detailed description of the invention, numeral 11 designates generally the cathode ray television tube having a neck 12 and a plug member 13. Deflecting and focus coils shown diagrammatically at 14 and 15, respectively, are mounted adjacent the neck 12 of the tube 11 and encompass the same. The novel centering device is shown generally by the numeral 16.

The centering device 16 comprises a ring 17 formed of insulating material, such as impregnated cardboard. The ring 17 is provided with opposite tabs 18 and 19. The tab 19 has an aperture 21 therein for a purpose hereinafter described. The ring 17 is also provided with an annular embossment 22 which, however, does not connect at one point 23.

A first permanent magnet is shown at 24 and comprises a ring of magnetic material which is open at 25. The ring 24 is adapted to be inserted into the embossment 22 on the ring 17. A central opening is shown at 28 and is also formed of an insulating material such as impregnated cardboard.

The second permanent magnet comprises a ring 26 which is open at 27. The permanent magnets are magnetized so that the two north and the common south poles, designated by the letters "N" and "S" are in the position shown in Figure 4.

A second ring preferably formed of impregnated cardboard is shown at 29 and is provided with tabs 30 and 31, corresponding to the tabs 18 and 19 of ring 17. The tab 31 also has an aperture 32 provided therein. The ring 29 is also provided with an annular embossment 33 which does not connect as shown at 34. The permanent magnet 26 is adapted to be inserted in the embossment 33. When the centering device is assembled, as shown in Figure 3, the permanent magnets 24 and 26 do not move relative to the rings 17 and 29, due to the portions 23 and 34 of the rings, which are not embossed.

A retaining and assembly member comprises a collar 35 which is also formed of non-magnetic material, such as impregnated cardboard. The collar 35 is provided with a rolled edge shown at 36 and initially with an unrolled edge shown at 37. The diameter of the main outside portion of the collar 35 is slightly less than the openings in the rings 17, 28, and 29, so that the collar may freely rotate within said rings when assembled.

In order to assemble the centering device 16, the permanent magnets 24 and 26 are positioned in the embossments 22 and 33, respectively, and the collar 35 is inserted through the openings in the rings 17, 28 and 29. After the parts are drawn up fairly tightly, the edge 37 of the collar is spun over by any suitable means and the parts are held in the relation shown in Figure 3. The rings 17 and 29 may both be rotated together or relatively to each other about the collar 35 as an axis.

The mounting strip for the centering device 16 is shown generally at 38 and comprises a strip of metal, such as Phosphor bronze, which is provided with solid ends 39 and 41. Extending from the solid ends 39 and 41 are spaced fingers 42, 43 and 44, 45, respectively. The strip is provided with an elongated aperture 47 centrally thereof which results in providing a pair of thin connections 46 between the solid portions 39 and 41. The strip, being formed of Phosphor bronze, is fairly resilient and, in order to mount the centering device 16, it is disposed on the centering device as shown best in Figures 2 and 3. The fingers 42, 43 and 44, 45 engage the rolled edges 36 and 37 of the collar 35 and do not interfere with rotation of the rings 17 and 29. The elongated aperture 47 encompasses portions of the edges 36 and 37 of the collar 35 and permits expansion of the strip 38 when the device is slid over the neck 12 of the cathode ray tube 11. Tabs 48 are provided on the solid portions 39 and 41 to permit ease in mounting and dismounting the strip 38 from the centering device 16.

Figure 6:
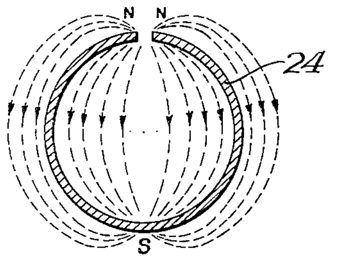
Figure 6 is a section of one of the magnetic rings showing the magnetic field pattern.
Figure 7:
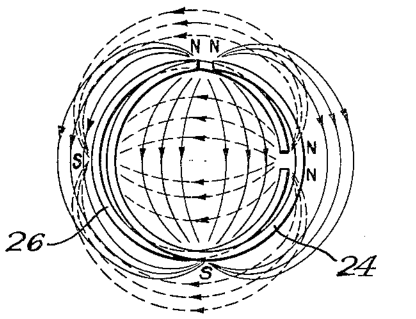
Figure 7 is a diagrammatic view showing the magnetic field pattern of two of the magnetic rings superimposed and magnetically offset 90° from each other.
Figure 8:
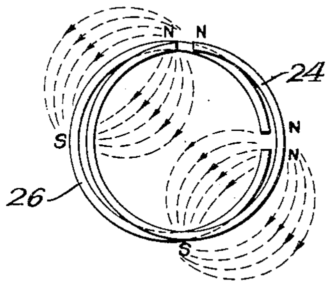
Figure 8 is a diagrammatic view showing the resultant magnetic pattern of Figure 7.

Referring specifically to Figures 6 to 11, inclusive, Figure 6 is a section of one of the magnetic rings showing the magnetic field pattern resulting therefrom. Figure 7 shows two rings 24 and 26 magnetically offset 90° with respect to each other. The full lines show the magnetic field pattern of the magnet 24 and the dotted lines show the magnetic field pattern of the magnet 26. Figure 8 shows the resultant pattern of the magnetic fields when the two magnets 24 and 26 are magnetically offset 90° from each other, as shown in Figure 7.

Figure 9:
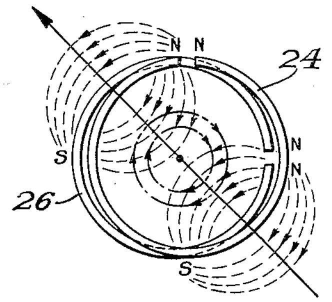
Figure 9 is a diagrammatic view showing the current flowing inwardly of the drawing and the electron beam flowing outwardly thereof, with the resulting deflection toward the weaker field.

Assuming that the current is moving inwardly of the drawing in Figure 9 and the electron beam is moving outwardly of the drawing, and applying the "right hand rule," the magnetic lines around the beam will be rotating in a clockwise direction. The weakest part of the field will be at an angle of 45° upwardly to the left as shown by the solid line arrow in Figure 9. In Figure 9 the resultant pattern of the permanent magnets 24 and 26 is shown in dotted lines and the magnetic lines around the electron beam are dot and dash lines. It will be obvious that the pattern is flowing against the rotating magnetic lines around the beam at the greatest intensity at a point approximately 45° upwardly to the left. The beam, therefore, tends to move toward the weaker field which moves the beam on the fluorescent screen in that direction.

Figure 10:
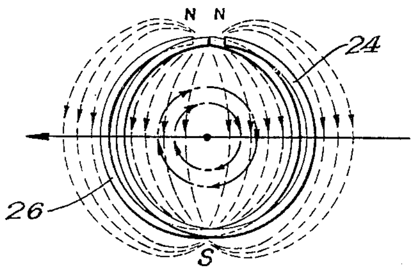
Figure 10 is a view similar to Figure 9 wherein the two magnets are in line magnetically, with the north poles at the top and the south poles at the bottom, again showing the deflection of the beam toward the weaker field.

Referring to Figure 10, this view is the same generally as Figure 9, except that the two magnets 24 and 26 are magnetically in line, with the north poles at the top and the south poles at the bottom. The result, obviously, is that the weakest field will be horizontally to the left and the beam will move in this direction.

Figure 11:
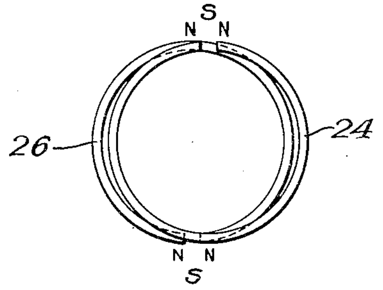
Figure 11 is a view of the two magnetic rings offset 180° from each other wherein no theoretical field pattern results.

Figure 11 shows no theoretical field pattern when the magnets 24 and 26 are offset 180° and, therefore, the beam is not deflected or affected in any way by the magnets 24 and 26.

Obviously, the invention is not limited to the use of permanent magnets, as the field desired may be produced in any desired manner, such as, for example, by electrical coils or conductors.

It will be understood that the deflection of the electron beam for centering may be in any desired direction and that this is possible because both rings are movable to any position about a 360° rotation and are movable relatively to each other so that the weaker magnetic field may be set up wherever desired. The amount of deflection required for centering is not of great magnitude and a centering device which is, for example, capable of deflecting the beam one inch to one and one-half inches in any direction in a ten inch tube is sufficient.

It will be apparent that the adjustment of the centering device is very easy and is so positioned that the person making the adjustment need not touch any electrically conducting parts. Furthermore, the centering device 16 is positioned so that it is readily accessible from the back of the television set. The person making the adjustment can readily determine from the apertures 21 and 32 exactly what magnetic intensity is being produced and the direction thereof and is able to center the beam of the cathode ray television tube. Furthermore, after the adjustment has once been made, if it is necessary to readjust the centering device, the person making the new adjustment can immediately tell what the former adjustment was.

As stated heretofore, it is believed that the principle of centering the beam of a cathode ray television tube disclosed herein is new and useful, not only from the broad standpoint of being an entirely new principle, but also as to the specific details of construction of the centering device.

Some changes may be made in the construction and arrangement of the parts of our device without departing from the real spirit and purpose of our invention, and it is our intention to cover by our claims any modified forms of structure and use of mechanical equivalents which may be reasonably included within their scope without sacrificing any of the advantages thereof.

We claim as our invention:

1. A centering device for the ray beam of a cathode ray tube comprising three aligned annular disks adapted to receive the neck of a cathode ray tube and a pair of split magnet rings defining diametrically opposed poles sandwiched between adjacent disks, the central disk defining annular bearing surfaces on its opposite sides for the magnet rings and the outermost disks each having embossed portions receiving the respective magnets to sustain the same in position and control the positions of rotation thereof.

2. A centering device for the ray beam of a cathode ray tube comprising in combination three aligned annular disks adapted to receive the neck of a cathode ray tube and a pair of split magnet rings defining diametrically opposed poles sandwiched between adjacent disks, the central disk defining an annular bearing surface for the magnet rings and the outermost disks each having embossed portions receiving the respective magnets to sustain the same in position and control the positions of rotation thereof and having handle-defining conformations extending radially outwardly to facilitate adjustment.

3. An adjustable centering device for the ray beam of a cathode ray tube comprising in combination, a sleeve adapted to receive the neck of a cathode ray tube, three annular disks carried by the sleeve, a pair of split ring magnets sandwiched between the disks, the sleeve having shoulder elements retaining the end disks thereon, the center disk forming an annular bearing surface for each magnet, the end disks having embossed portions receiving the split ring magnets to sustain the same in position and control the positions of rotation thereof about the sleeve.

4. A unitary centering device for the ray beam of a cathode ray tube and adapted to be carried directly by the neck of the tube comprising in combination a sleeve adapted to receive the neck of the cathode ray tube and defining spaced annular shoulders, a pair of end rings snugly but rotatably received on the sleeve and bottoming against the respective shoulders thereof, an intermediate ring positioned between the end rings, a pair of split ring magnets defining diametrically opposed poles sandwiched between the intermediate ring and the end rings, respectively, the intermediate ring defining annular bearing surfaces for the magnets and the end rings having embossed portions to receive the magnets snugly to sustain the same and control the rotation thereof, and a resilient element anchored to the sleeve and extending within the confines thereof to be received on the neck of the cathode ray tube to support the unit thereon.

5. A centering device for the ray beam of a cathode ray tube comprising in combination three aligned annular disks adapted to receive the neck of a cathode ray tube and a pair of split magnet rings defining diametrically opposed poles sandwiched between adjacent disks, the control disk defining an annular bearing surface for each magnet ring and each outer disk having embossed portions snugly receiving the respective magnets to sustain the same and control the rotational positions thereof, each outer disk having an apertured radially protruding finger to facilitate adjustment.

6. A centering device for the ray beam of a cathode ray tube comprising three aligned annular disks adapted to receive the neck of a cathode ray tube and a pair of split magnet rings defining diametrically opposed poles sandwiched between adjacent disks, the central disk defining annular bearing surfaces on its opposite sides for the magnet rings and the outermost disks each having magnet ring engaging conformations to anchor the rings relative thereto and control the positions of rotation of the rings.

THEDORE OBSZARNY.
JOHN SCHMIDT.

REFERENCES CITED

The following references are of record in the file of this patent:

UNITED STATES PATENTS

| Number | Name | Date |
|---|---|---|
| 2,102,421 | Kuehni | Dec. 14, 1937 |
| 2,188,579 | Schlesinger | Jan. 30, 1940 |
| 2,211,613 | Bowie | Aug. 13, 1940 |
| 2,224,933 | Schlesinger | Dec. 17, 1940 |
| 2,274,586 | Branson | Feb. 24, 1942 |
| 2,431,077 | Poch | Nov. 18, 1947 |
| 2,455,977 | Bocciarelli | Dec. 14, 1948 |
| 2,456,474 | Wainwright | Dec. 14, 1948 |
| 2,460,609 | Torsch | Feb. 1, 1949 |
| 2,498,354 | Bocciarelli | Feb. 21, 1950 |
| 2,499,065 | Heppner | Feb. 28, 1950 |
| 2,513,929 | Gethmann | July 4, 1950 |

FOREIGN PATENTS

| Number | Country | Date |
|---|---|---|
| 464,637 | Great Britain | Apr. 21, 1937 |